(12) United States Patent
Heymel et al.

(10) Patent No.: US 10,882,110 B2
(45) Date of Patent: Jan. 5, 2021

(54) METHOD AND DEVICE FOR APPLYING FLUIDS

(71) Applicant: VOXELJET AG, Friedberg (DE)

(72) Inventors: Bastian Heymel, Augsburg (DE); Josef Grasegger, Stadtbergen (DE); Ingo Ederer, Geltendorf (DE)

(73) Assignee: VOXELJET AG, Friedberg (DE)

( * ) Notice: Subject to any disclaimer, the term of this patent is extended or adjusted under 35 U.S.C. 154(b) by 332 days.

(21) Appl. No.: 15/757,913

(22) PCT Filed: Sep. 8, 2016

(86) PCT No.: PCT/DE2016/000340
§ 371 (c)(1),
(2) Date: Mar. 6, 2018

(87) PCT Pub. No.: WO2017/041779
PCT Pub. Date: Mar. 16, 2017

(65) Prior Publication Data
US 2018/0339452 A1    Nov. 29, 2018

(30) Foreign Application Priority Data

Sep. 9, 2015  (DE) .................. 10 2015 011 503

(51) Int. Cl.
*B22F 3/00*    (2006.01)
*B33Y 10/00*    (2015.01)
(Continued)

(52) U.S. Cl.
CPC .............. *B22F 3/003* (2013.01); *B22F 3/008* (2013.01); *B28B 1/001* (2013.01); *B29C 64/165* (2017.08);
(Continued)

(58) Field of Classification Search
CPC .... B29C 64/214; B29C 64/241; B29C 64/321
See application file for complete search history.

(56) References Cited

U.S. PATENT DOCUMENTS 3,668,997 A   6/1972  Ratowsky
3,913,503 A   10/1975 Becker
(Continued)

FOREIGN PATENT DOCUMENTS

AU    720255 B2    5/2000
CN    1163586 A    10/1997
(Continued)

OTHER PUBLICATIONS

US 4,937,420 A, 06/1990, Deckard (withdrawn)
(Continued)

*Primary Examiner* — Jacob T Minskey
*Assistant Examiner* — Virak Nguon
(74) *Attorney, Agent, or Firm* — The Dobrusin Law Firm, P.C.

(57) ABSTRACT

The invention relates to a method and a device for applying fluids, particularly in a method for producing three-dimensional shaped parts, wherein a coating device comprising a blade, a fluid outlet and a reservoir is provided, and the blade is displaced across the working field such that it can implement a rotational movement type vibration, said vibration occurring as the result of a stroke by a linear actuator.

20 Claims, 8 Drawing Sheets

(51) Int. Cl.
*B33Y 30/00* (2015.01)
*B29C 64/214* (2017.01)
*B29C 64/241* (2017.01)
*B29C 64/165* (2017.01)
*B28B 1/00* (2006.01)
*B22F 3/105* (2006.01)

(52) U.S. Cl.
CPC .......... *B29C 64/214* (2017.08); *B29C 64/241* (2017.08); *B33Y 10/00* (2014.12); *B33Y 30/00* (2014.12); *B22F 2003/1056* (2013.01); *Y02P 10/25* (2015.11)

(56) References Cited

U.S. PATENT DOCUMENTS

| | | |
|---|---|---|
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,721 A | 11/1996 | Gillette |
| 5,589,222 A | 12/1996 | Thometzek et al. |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,824,250 A | 10/1998 | Whalen |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 5,997,795 A | 12/1999 | Danforth |
| 6,007,318 A | 12/1999 | Russell et al. |
| 6,042,774 A | 3/2000 | Wilkening et al. |
| 6,048,188 A | 4/2000 | Hull et al. |
| 6,048,954 A | 4/2000 | Barlow et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,460,979 B1 | 10/2002 | Heinzl et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,616,030 B2 | 9/2003 | Miller |
| 6,649,121 B1 | 11/2003 | Hamamoto |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 6,905,645 B2 | 6/2005 | Iskra |
| 6,972,115 B1 | 12/2005 | Ballard |
| 7,087,109 B2 | 8/2006 | Bredt et al. |
| 7,120,512 B2 | 10/2006 | Kramer et al. |
| 7,153,463 B2 | 12/2006 | Leuterer et al. |
| 7,291,002 B2 | 11/2007 | Russell et al. |

(56) References Cited

U.S. PATENT DOCUMENTS

| | | |
|---|---|---|
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,387,359 B2 | 6/2008 | Hernandez et al. |
| 7,455,805 B2 | 11/2008 | Oriakhi et al. |
| 7,497,977 B2 | 3/2009 | Nielsen et al. |
| 7,578,958 B2 | 8/2009 | Patel et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höschmann et al. |
| 7,887,264 B2 | 2/2011 | Naunheimer et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2002/0182351 A1 | 12/2002 | Akiyama |
| 2003/0004599 A1 | 1/2003 | Herbak |
| 2003/0065400 A1 | 4/2003 | Beam et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1* | 9/2004 | Ederer .................. B05C 11/023 427/355 |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0046067 A1 | 3/2005 | Oriakhi |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0276976 A1 | 12/2005 | Pfeifer et al. |
| 2005/0280185 A1 | 12/2005 | Russell et al. |
| 2005/0283136 A1 | 12/2005 | Skarda |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0069994 A1 | 3/2008 | Kanda |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2009/0283501 A1 | 11/2009 | Erikson et al. |
| 2010/0007048 A1 | 1/2010 | Schweininger |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0094026 A1* | 4/2012 | Ederer .................. B05D 1/26 427/356 |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1* | 4/2015 | Hartmann ............. B29C 64/205 425/78 |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0318251 A1 | 3/2016 | Ederer et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0368214 A1* | 12/2016 | Sasaki ................ B29C 67/0081 |
| 2016/0368215 A1* | 12/2016 | Miyano ................ B29C 64/329 |

(56) References Cited

U.S. PATENT DOCUMENTS

| | | |
|---|---|---|
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0341302 A1* | 11/2017 | Hochsmann .......... B29C 64/255 |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0326662 A1 | 11/2018 | Gunther et al. |
| 2018/0339452 A1 | 11/2018 | Heymel et al. |
| 2018/0369910 A1 | 12/2018 | Gunter et al. |
| 2019/0047218 A1 | 2/2019 | Ederer et al. |
| 2019/0084229 A1 | 3/2019 | Gunther |

FOREIGN PATENT DOCUMENTS

| | | |
|---|---|---|
| CN | 1988990 A | 6/2007 |
| CN | 101146666 A | 3/2008 |
| CN | 103706794 A | 4/2014 |
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| EP | 0361847 B1 | 4/1990 |
| EP | 1415792 | 5/2004 |
| EP | 1457590 A | 9/2004 |
| GB | 2297516 A | 8/1996 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |

OTHER PUBLICATIONS

International Search Report and Written Opinion, PCT Application No. PCT/DE2016/000343, dated Dec. 21, 2016.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, pp. 130-133.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary Feb. 22, 2005.

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, abstract only; Sep. 25, 2001.

Armin Scharf, "Erster 3D-Endlosdrucker", zwomp.de, http://www.zwomp.de/2012/11/06/voxeljet-endlosdrucker/ dated Nov. 6, 2012.

Screen shots of URL: http://www.youtube.com/watch?v=hgIrNXZjIxU taken in approximately 5 second intervals on Nov. 12, 2015.

Jacobs et al., 2005 SME Technical Paper, title "Are QuickCast Patterns Suitable for Limited Production?".

* cited by examiner

METHOD AND DEVICE FOR APPLYING FLUIDS

CLAIM OF PRIORITY

This application is a national phase filing under 35 USC § 371 from PCT Application serial number PCT/DE2016/000340 filed on Sep. 8, 2016 and claims priority therefrom. This application further claims priority from German Patent Application DE 10 2015 011 503.0 filed on Sep. 9, 2015. PCT/DE2016/000340 and DE 10 2015 011 503.0 are each incorporated by reference in its entirety.

The invention relates to a device and a method for applying fluids, in particular in a method for producing three-dimensional objects.

European Patent EP 0 431 924 B1 describes a process for producing three-dimensional objects based on computer data. In the process, a thin layer of particulate material is deposited on a platform by means of a coater (recoater) and has a binder material selectively printed thereon by means of a print head. The particulate region with the binder printed thereon bonds and solidifies under the influence of the binder and, optionally, an additional hardener. Next, the construction platform is lowered by one layer thickness or the coater/print head unit is raised and a new layer of particulate material is applied, the latter also being printed on selectively as described above. These steps are repeated until the desired height of the object is achieved. Thus, the printed and solidified regions form a three-dimensional object (molded part).

Upon completion, the object made of solidified particulate material is embedded in loose particulate material, from which it is subsequently freed. For this purpose a suction device may be used, for example. This leaves the desired objects which then have to be freed from any powder adhering to them, e.g. by brushing them off manually.

3D printing on the basis of pulverulent materials and the introduction of liquids using a print head is the quickest method among the layer construction techniques.

This method allows the processing of different fluids, such as particulate materials, for example, which includes—as a non-exhaustive example—natural biological raw materials, polymeric plastic materials, metals, ceramics and sands.

Other powder-based rapid prototyping processes, e.g. selective laser sintering or electron beam sintering, work in a similar manner, also applying loose particulate material layer by layer and selectively solidifying it using a controlled physical source of radiation.

Moreover, there are further methods, such as e.g. Fused Deposition Modeling (FDM) layer construction methods, wherein the cross-sections of each part are constructed using a liquid medium which solidifies outside a nozzle, changing the position of the construction platform by one layer thickness with respect to the previous position, and repeating these steps until the part is finished.

In the following, all these processes will be summarized by the term "three-dimensional printing method" or "3D printing method".

Some of these methods use different coating options. In some methods, the particulate material required for the entire layer is placed in front of a thin blade. The latter is then moved over the construction area, spreading the material placed in front of it and thereby smoothing it. Another type of layer application consists in continuously placing a small volume of particulate material in front of the blade as it moves. For this purpose, the blade is usually mounted to the underside of a movable silo. Directly above or next to the blade, an adjustable gap is provided through which the particulate material can flow out of the silo. The flow is stimulated by introducing oscillations into the silo/blade system.

Conventional coaters using the functional principle of oscillating blades usually serve only to apply a specific material. In this case, the oscillation is generated by an eccentric mechanism. A material/parameter change, such as a change in the amplitude of oscillation, for example, requires the mechanical adaptation of oscillating blade or the oscillating mechanism, respectively, by means of rather complex external mechanisms. In this case, the prior art provides for the exchange of eccentrics in order to change the amplitude of oscillation. The coater angle may be adjusted by rotating the entire coater and/or by mechanically changing the distance between the coater and the eccentric.

Therefore, it was an object of the present invention to provide a device and a method allowing easy and reliable adjustment of the amplitude of oscillation.

Another object of the present invention, was to provide a device and a method allowing easy adjustment of the coater angle, optionally during an application process.

BRIEF SUMMARY OF THE DISCLOSURE

In one aspect, the disclosure relates to a method for applying fluids, in particular in a method for producing three-dimensional models, by means of a device onto a construction field, wherein a coater, comprising a blade, a fluid outlet and a reservoir, is provided and wherein the blade is moved over the construction field in a manner allowing it to perform an oscillation in the form of a rotary motion, and wherein said oscillation is effected by a linear actuator generating a stroke.

In another aspect, the disclosure also relates to a device for applying fluids, in particular in a method for producing three-dimensional models, onto a construction field, wherein a coater, comprising a blade, a fluid outlet and a reservoir, is provided and wherein the blade can be moved over the construction field in a manner allowing it to perform an oscillation in the form of a rotary motion, and wherein a linear actuator generating a stroke is provided in order to generate said oscillation.

In a still further aspect, the disclosure relates to a coater for applying fluids, in particular in a method for producing three-dimensional models, onto a construction field, said coater comprising a blade, a fluid outlet and a reservoir, and wherein the blade can be moved over the construction field in a manner allowing it to perform an oscillation in the form of a rotary motion, and wherein a linear actuator generating a stroke is provided in order to generate said oscillation.

DETAILED DESCRIPTION

Figure 1:
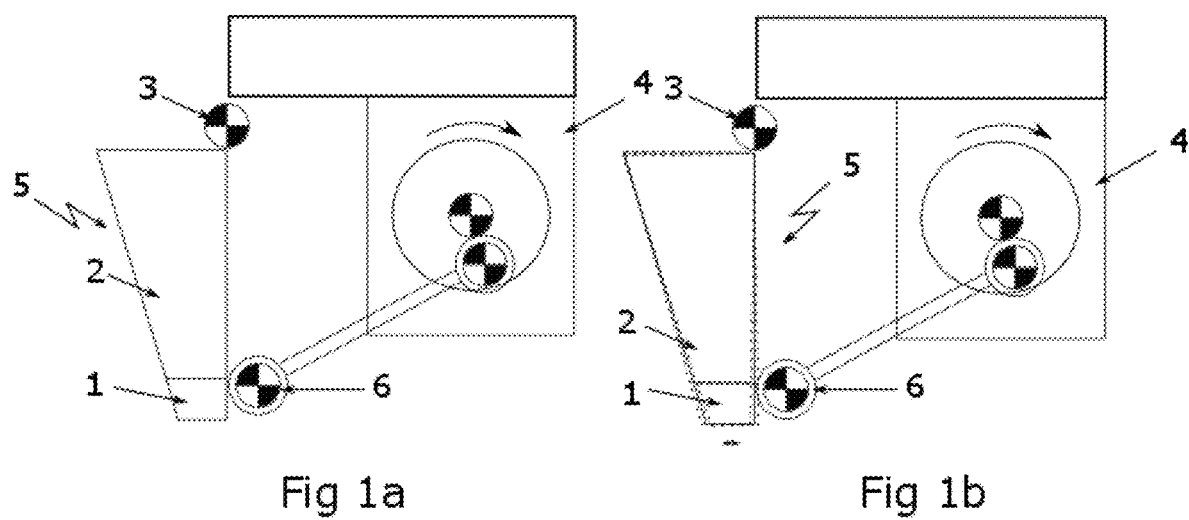
FIG. 1: Schematic representation of a coater with an oscillating blade according to the prior art in a resting state (FIG. 1a) and in an oscillating state (FIG. 1b).

In the following, several terms will be defined more precisely. Otherwise, the terms used shall have the meanings known to the person skilled in the art.

In the sense of the invention, "3D printing methods" are all methods known from the prior art which enable the construction of parts in three-dimensional molds and are compatible with the described process components and devices.

"Selective binder application" or "selective binder system application" in the sense of the invention may be effected after each particulate material application or irregularly, i.e. non-linearly and parallel after each particulate material application, depending on the requirements for the molded article and for optimization of the molded article production. Thus, "selective binder application" or "selective binder system application" may be adjusted individually, during the course of the molded article production.

A "molded article" or "part" in the sense of the invention means all three-dimensional objects manufactured by means of the method according to the invention or/and the device according to the invention and exhibiting dimensional stability.

The "device" used for carrying out the method according to the invention may be any known 3D-printing device which includes the required parts. Common components include coater, construction field, means for moving the construction field or other parts, a metering device and heating means and other parts which are known to the person skilled in the art and will therefore not be described in detail herein.

As "fluids", all flowable materials known for 3D printing may be used, in particular in the form of a powder, slag or liquid. These may include, for example, sands, ceramic powders, glass powders and other powders of inorganic materials, metal powders, plastic materials, wood particles, fiber materials, celluloses or/and lactose powders, as well as other types of organic, pulverulent materials. The particulate material is preferably a free-flowing powder when dry, but a cohesive, cut-resistant powder may also be used. This cohesivity may also result from adding a binder material or an auxiliary material.

A "construction field" is the plane or, in a broader sense, the geometric location on or in which the particulate material bed grows during the construction process by repeated coating with particulate material. The construction field is frequently bounded by a bottom, i.e. the construction platform, by walls and an open top surface, i.e. the construction plane.

The "print head" consists of various components. These include the print modules which are aligned with respect to the print head. The print head is aligned with respect to the machine. This allows the position of a nozzle to be assigned to the machine coordinate system.

"Coater" or "recoater" means the unit by means of which the fluid is applied into or onto the construction field. The unit may consist of a fluid reservoir and a fluid application unit wherein, according to the present invention, the fluid application unit comprises a fluid outlet and a coating blade.

A "blade", "oscillating blade" or "coating blade" in the sense of the invention is that part which levels the applied fluid.

A "fluid outlet" in the sense of the invention is the opening by means of which the fluid is applied onto the construction field. The "fluid outlet" comprises at least one discharge gap, but may also comprise several discharge gaps. The "fluid outlet" may preferably form a unit with one or two fluid reservoirs.

In this case, the "reservoir" or "fluid reservoir" is the receptacle for the fluid. This container may be arranged to oscillate, or not, when the blade oscillates. There are embodiments in which the blade forms part of the reservoir.

A "linear actuator" is understood to be an actuator for generating the oscillation of the blade and whose attachment points perform an approximately linear, oscillating movement with respect to each other.

The "stroke" is understood to be the maximum linear movement of the actuator. According to the invention, this is the movement which generates the amplitude of oscillation. Preferably, the stroke also serves to achieve an angle adjustment of the coating blade or of the coater, respectively, or optionally to close the fluid outlet.

"Angle adjustment" in the sense of the invention is the adjustment of the angle between the construction field and the coating blade, and the "coater angle" is that angle which the construction field normal and the line connecting the fulcrum and the blade enclose. The coater oscillation takes place around this line as the zero line.

An oscillation in the form of a rotary motion in the sense of the invention is the movement of the blade or coating blade via a fulcrum, said movement preferably being generated by an actuator.

Various aspects of the invention will be described below.

In one aspect, the invention relates to a method for applying fluids, in particular in a method for producing three-dimensional molded articles, by means of a device onto a construction field, wherein a coater, comprising a blade with a fluid outlet and a reservoir, is provided and wherein the blade is moved over the construction field in a manner allowing it to perform an oscillation in the form of a rotary motion, and wherein said oscillation is effected by a linear actuator generating a stroke.

Using a method according to the present invention, the oscillating range of the blade is extended. This is achieved by using a linear actuator which can generate an oscillation stroke in a freely controllable/adjustable manner.

The free controllability/adjustability of the stroke allows easy adjustment of the amplitude of oscillation. For this purpose, prior art coaters require complex kinematics or a modified connection (e.g. eccentricity).

According to a preferred embodiment of the invention, the actuator may generate a stroke of at least 3× the amplitude of oscillation, in which case the stroke is easily adjustable to produce greater amplitudes of oscillation, although it may also serve to achieve an angle adjustment of the coating blade or of the coater, respectively, or optionally to close the fluid outlet.

In a method according to the invention, the stroke is preferably generated electrically, electrodynamically, electrostatically, pneumatically, hydraulically and/or mechanically. This may also be achieved by using mechanical lever systems.

According to an embodiment of the invention, a connection of the coater to the device is performed in at least one fulcrum. Such an embodiment has proven advantageous because it allows the oscillation to be generated relatively easily.

In a method according to the invention, an adjustment of a coater angle with respect to the construction field may preferably be effected without shifting any connection points and, optionally, even during a coating process. The adjustment of the coater angle could be effected here by shifting a starting position of the actuator.

This is advantageous because the angle of the coater with respect to the construction field is very important for the coating result and also needs to be adapted for different materials. In prior art coaters, the entire coater needs to be pivoted in order to adjust it or the connection points need to be shifted.

According to a preferred embodiment of the invention, the adjustment of the coater angle can now also be performed during operation of the device or during the coating operation.

By selecting a large stroke, it is even possible, according to the present invention, for the coating blade to be lifted off the construction field by pivoting the blade. This requires neither any additional lifting device nor lowering of the construction field in order to achieve a sufficient distance.

According to a particularly preferred embodiment of the present invention, coating is possible in both directions of movement. This is possible because the coating angle is easy to adjust, thus facilitating adjustment of the coater angle according to the movement direction, and thereby allowing coating in both directions.

In another aspect, the present invention also relates to a device for applying fluids, in particular in a method for producing three-dimensional molded articles, onto a construction field, wherein a coater, comprising a blade, a fluid outlet and a reservoir, is provided and wherein the blade can be moved over the construction field in a manner allowing it to perform an oscillation in the form of a rotary motion, and wherein a linear actuator generating a stroke is provided in order to generate said oscillation.

The actuator is preferably designed to generate a stroke of at least 3 times the amplitude of oscillation.

The stroke may be generated by electric, electrodynamic, electrostatic, pneumatic, hydraulic and/or mechanical systems.

The coater is preferably connected to the device in at least one fulcrum.

According to another preferred embodiment of the invention, a counterpiece corresponding to the blade is provided for closing an opening of the coater in an outer area of the maximum amplitude, opposite the actuator. Thus, by pivoting the coater it is now possible to close the coater opening and thereby enable selective application in specific location and/or prevent inadvertent leakage of the reservoir.

In another aspect, the present invention relates to a coater for applying fluids, in particular in a method for producing three-dimensional molded articles, onto a construction field, said coater comprising a blade and a reservoir, and wherein the blade can be moved over the construction field in a manner allowing it to perform an oscillation in the form of a rotary motion, wherein a linear actuator generating a stroke is provided in order to generate said oscillation.

Preferred embodiments will be described below.

The present invention will be explained in more detail below, with reference to examples representing preferred embodiments.

A schematic representation of a coater with an oscillating blade according to the prior art in a resting state and in an oscillating state is shown in FIG. 1.

A coater (5) comprising a blade (1), a fluid outlet and a reservoir (2) is connected to a device for producing three-dimensional molded parts via a connection (6), a fulcrum (3). FIG. 1a) shows the resting state and FIG. 1b) outlines the oscillating state. The amplitude of oscillation is determined by the eccentric. Since the oscillation is intended to be relatively small, a small amplitude of movement is set by the eccentric.

Figure 2:
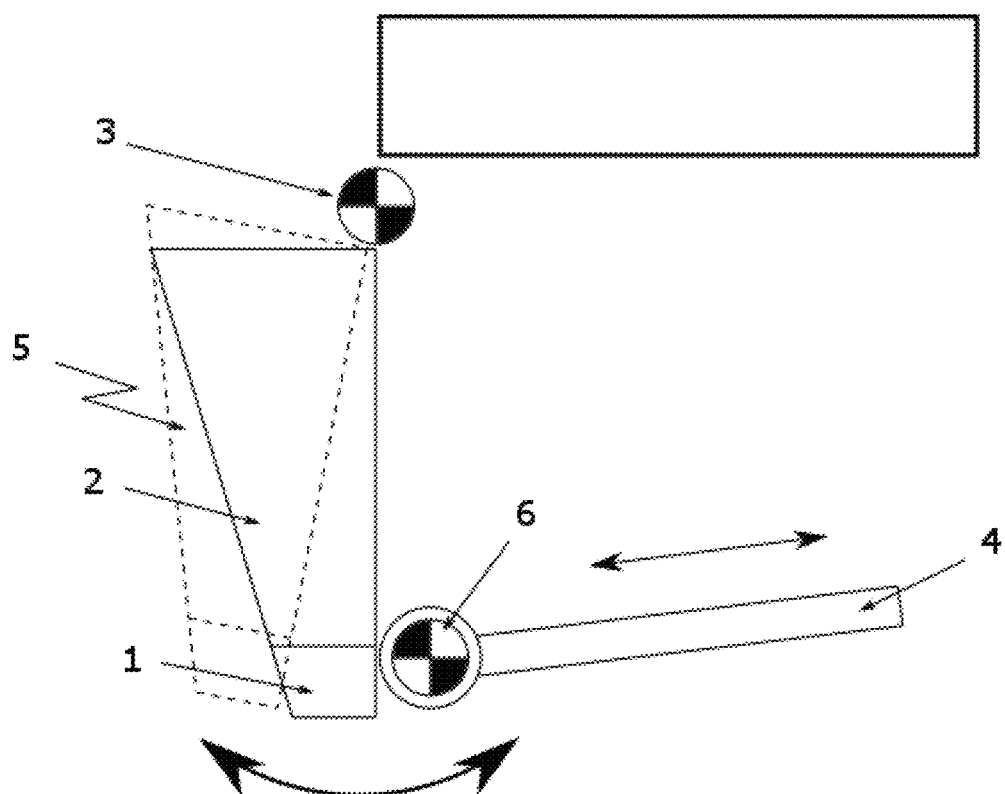
FIG. 2: Schematic representation of a coater with an oscillating blade according to a preferred embodiment of the present invention.

FIG. 2 schematically shows a coater (5) with an oscillating blade (1) according to a preferred embodiment of the present invention. In the embodiment shown, the coater (5) is also connected to the device via a fulcrum (3). The reservoir (2) is arranged above the blade (1) and, according to this embodiment, oscillates together with the blade (1). Now, the stroke is generated here by a linear actuator (4), which is in turn connected to the blade (1) or the coater (5), respectively, via a fulcrum (6). Exciting the actuator (4) allows an oscillation to be generated which is relatively easy to select differently, thus resulting in an extended range of oscillation.

According to this embodiment shown here, anything arranged below the fulcrum (3) oscillates. Thus, the reservoir (2) and the blade (1) oscillate. According to the present invention, the oscillation of the reservoir (2) is not absolutely necessary. However, an oscillation of the reservoir (2) may serve to achieve better fluidization of the fluid.

Figure 3A:
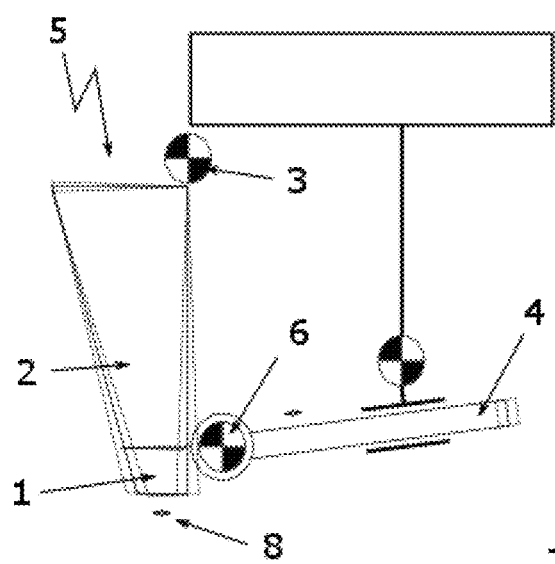
FIG. 3: Schematic representation of a coater with an oscillating blade according to a preferred embodiment of the present invention, wherein the coater is shown at a first angle (FIG. 3a) and at a second angle after angle adjustment (FIG. 3b).
Figure 3B:
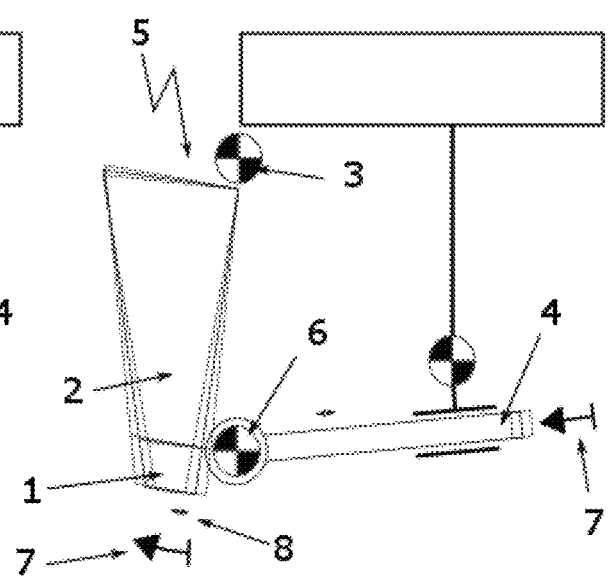

A schematic representation of a coater with an oscillating blade according to a preferred embodiment of the present invention is shown in FIG. 3. In this drawing, the coater is shown at a first angle (FIG. 3a) and at a second angle after angle adjustment (FIG. 3b). As is evident, the oscillating movement is the same for both embodiments. These oscillating movements are relatively small movements (8). For angle adjustment of the blade (1) or of the coater (5), respectively, a large actuator movement (7) may be carried out, around which the oscillation then oscillates in turn.

In this case, the fulcrum (3) is responsible for guiding and stabilizing the blade movement. Its rigidity and freedom of movement have a substantial impact on the coating result.

Figure 4:
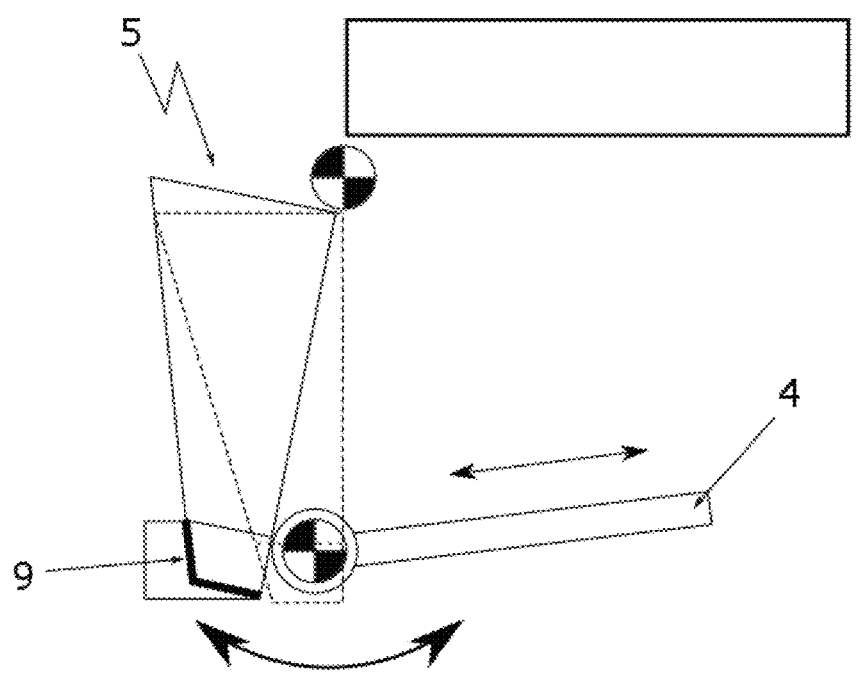
FIG. 4: Schematic representation of a coater with a locking device according to another preferred embodiment of the invention.
Figure 5:
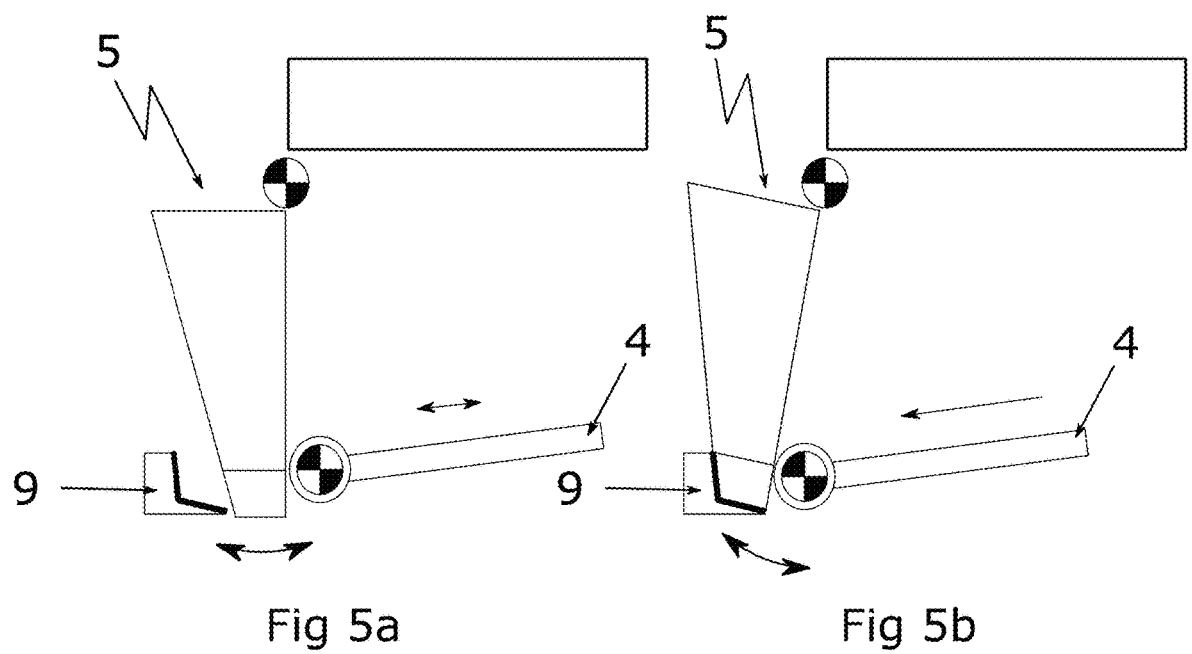
FIG. 5: Schematic representation of the coater with locking device of FIG. 4, showing an oscillating position (FIG. 5a) and a locked position (FIG. 5b).

FIG. 4 shows a schematic representation of a coater (5) with a locking device (9) according to another preferred embodiment of the invention. FIG. 5 shows the coater (5) with locking device (9) of FIG. 4, showing an oscillating position (FIG. 5a) and a locked position (FIG. 5b).

Due to the possibility of a relatively large stroke of the linear actuator (4), the coater (5) can pivot so far to the left that it can be locked in a "locking station" (9).

Figure 6:
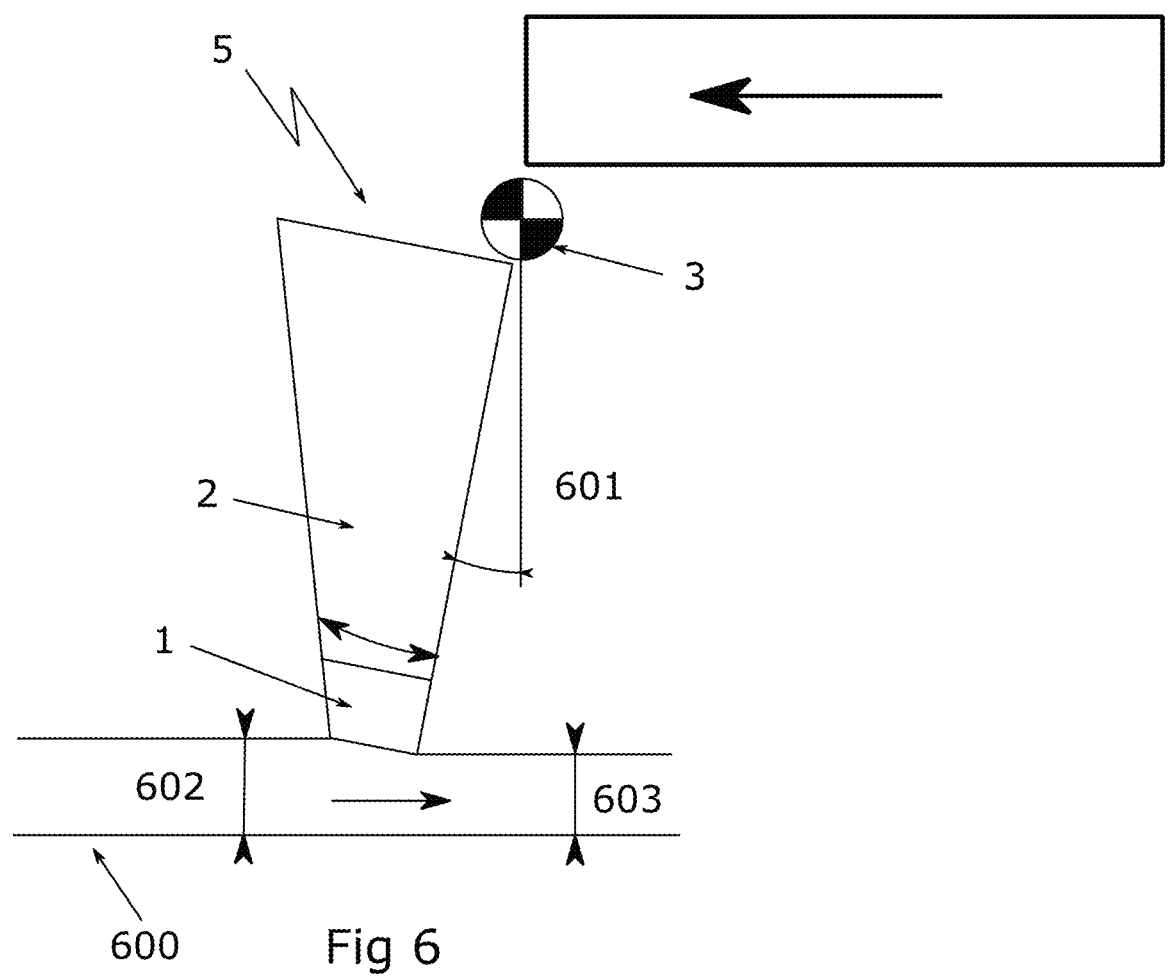
FIG. 6: Schematic representation showing the fluid being compacted by adjustment of the coater angle.

FIG. 6 shows a schematic representation of the fluid being compacted via an adjustment of the coater angle. In this case, the fluid flows out of the reservoir (1) above the blade (2), onto the construction field (600) below the blade, and is compacted to the final layer thickness (603), from the original layer thickness (602), by the blade which is inclined at the coater angle (601).

Figure 7A:
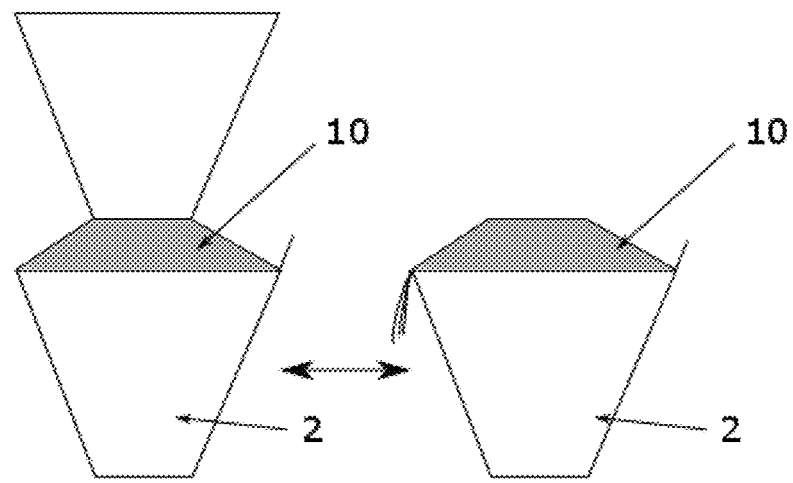
FIG. 7: Schematic representation showing the coater being filled in a straight, perpendicular position (FIG. 7a) and in a tilted position (FIG. 7b).
Figure 7B:
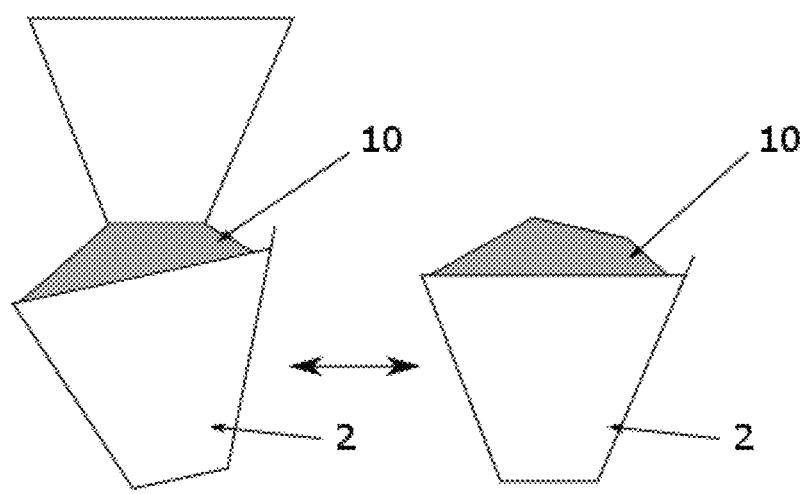

According to the present invention, it is possible to achieve improved filling of the coater. FIG. 7 shows a schematic representation showing the coater being filled in a straight, perpendicular position (FIG. 7a) and in a tilted position (FIG. 7b).

It has turned out that, by selective tilting of the reservoir (2) during filling, the material cone in the reservoir can be changed such that, after subsequent straightening of its position for coating, the material cone (10) has a much better shape, thereby considerably minimizing the undesired effect of the particulate material flowing over the edge of the reservoir after fluidization (by switching on the coater (5)).

By a short initial oscillation of the reservoir (2) in a tilted position, it is additionally possible to further optimize the material cone (10) and/or to discard some of the particulate material before the coater (5) is returned to its angular position for coating (FIG. 7).

Figures 8A, 8B:
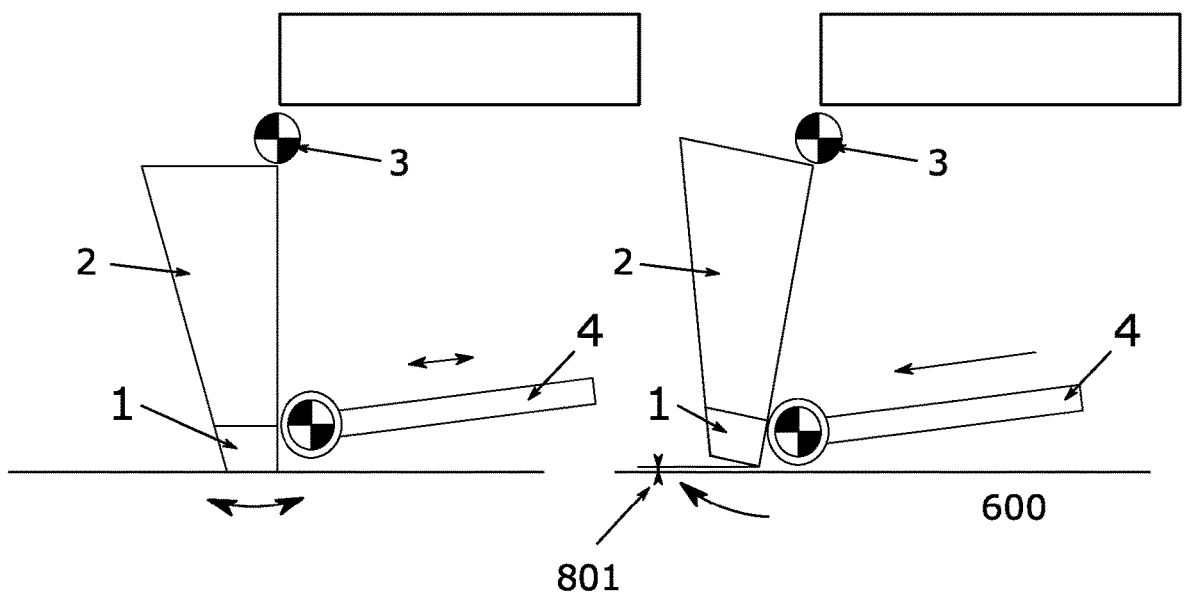
FIG. 8: Schematic representation showing the coater in operation and in a lifted state.

Lifting of the coating blade (2) by a distance (801) from the construction field (600) is effected, for example, by pivoting the blade. This is shown in FIG. 8. On the left, the coater (5) is shown in operation, and in a lifted-off state on the right. In the conventional coater, this requires a lifting device or lowering of the construction field in order to achieve a sufficient distance. According to the preferred embodiment shown, the blade (1) can now be pivoted slightly by the actuator, to such an extent that a distance (801) from the construction field (600) is achieved.

LIST OF REFERENCE NUMERALS

1 Blade
2 Reservoir
3 coater fulcrum
4 stroke generation
5 coater
6 connection point
7 actuator movement for angle adjustment
8 oscillation
9 locking device
10 material cone
600 construction field
601 coater angle
602 layer thickness
603 final layer thickness
801 lifting distance

What is claimed is:

1. A method for applying fluids, wherein the method is a method for producing three-dimensional molded articles, by means of a device onto a construction field, wherein a coater, comprising a blade, a fluid outlet and a reservoir, is provided and wherein the blade is moved over the construction field in a manner allowing it to perform an oscillation in the form of a rotary motion, characterized in that the oscillation is effected by means of a stroke by a linear actuator.

2. The method according to claim 1, characterized in that the linear actuator can generate a stroke of at least 3 times the amplitude of oscillation.

3. The method of claim 2, wherein the stroke is generated electrically, electrodynamically, electrostatically, pneumatically, hydraulically and/or mechanically.

4. The method of claim 3, wherein a connection of the coater to the device is performed in at least one fulcrum.

5. The method of claim 4, wherein an adjustment of a coater angle with respect to the construction field is effected without shifting any connection points.

6. The method of claim 4, wherein an adjustment of the coater angle is effected by shifting a starting position of the actuator.

7. The method of claim 2, wherein the stroke is generated electrically.

8. The method of claim 1, wherein the stroke is generated electrically, electrodynamically, electrostatically, pneumatically, hydraulically and/or mechanically.

9. The method of claim 1, wherein a connection of the coater to the device is performed in at least one fulcrum.

10. The method of claim 1, wherein an adjustment of a coater angle with respect to the construction field is effected without shifting any connection points and, optionally, during a coating process.

11. The method of claim 10, wherein the adjustment of the coater angle is effected by shifting a starting position of the actuator.

12. The device of claim 1, wherein coating is possible in both a forward and a reverse directions of movement.

13. A device for applying fluids, wherein the device is for producing three-dimensional molded articles, onto a construction field, wherein a coater, comprising a blade, a fluid outlet and a reservoir, is provided and wherein the blade can be moved over the construction field in a manner allowing it to perform an oscillation in the form of a rotary motion, characterized in that a linear actuator generating a stroke is provided for generating the oscillation.

14. The device according to claim 13, characterized in that the actuator can generate a stroke of at least 3 times the amplitude of oscillation.

15. The device of claim 14, wherein the device includes an electric, an electrodynamic, an electrostatic, a pneumatic, a hydraulic and/or a mechanical system for generating the stroke, and wherein the coater is connected to the device in at least one fulcrum.

16. The device of claim 13, wherein the linear actuator can generate a stroke of at least 3 times the amplitude of oscillation.

17. The device of claim 16, wherein the stroke is generated electrically, electrodynamically, electrostatically, pneumatically, hydraulically and/or mechanically.

18. A coater for applying fluids, wherein the coater is for producing three-dimensional molded articles, onto a construction field, said coater comprising a blade, a fluid outlet and a reservoir, and wherein the blade can be moved over the construction field in a manner allowing it to perform an oscillation in the form of a rotary motion, characterized in that a linear actuator generating a stroke is provided for generating the oscillation.

19. The coater of claim 18, wherein the linear actuator can generate a stroke of at least 3 times the amplitude of oscillation; and the stroke is generated electrically, electrodynamically, electrostatically, pneumatically, hydraulically and/or mechanically.

20. The coater of claim 18, wherein the linear actuator moves in a linear direction angled with respect to a direction that the coater travels over the build surface.

* * * * *